United States Patent [19]

McEwen

[11] 3,727,923

[45] Apr. 17, 1973

[54] DOUBLE LIFE SHAFT SEAL

[75] Inventor: John C. McEwen, Indianapolis, Ind.

[73] Assignee: General Motors Corporation, Detroit, Mich.

[22] Filed: Nov. 5, 1971

[21] Appl. No.: 195,971

[52] U.S. Cl. ..........................277/9, 277/50, 277/58, 277/153, 277/143, 277/208
[51] Int. Cl. ............................F16j 9/06, F16j 15/00
[58] Field of Search......................277/9, 50, 58, 138, 277/152, 153, 163, 143, 208

[56] References Cited

UNITED STATES PATENTS

| | | | |
|---|---|---|---|
| 2,316,713 | 4/1943 | Procter | 277/153 |
| 3,099,454 | 7/1963 | Walinski | 277/152 X |
| 3,207,521 | 9/1965 | Dega | 277/58 X |

*Primary Examiner*—Samuel B. Rothberg
*Attorney*—J. L. Carpenter et al.

[57] ABSTRACT

A double life shaft seal includes a seal case and an elastomeric sealing annulus having first and second seal lips adapted to be sequentially contacted by a rotating shaft. A tensioned garter spring is initially located on the sealing annulus so as to bias the first seal lip into operative sealing engagement with the shaft to provide a first service life, the spring being positioned thereat by spring biased expanded constriction ring restrained against axial movement by engagement with blocking lugs on the seal case. After predetermined wear of the first seal lip, the constriction ring contracts in diameter and loses contact with the blocking lugs at which time the ring and the garter spring are axially shifted to a second position wherein the garter spring is located so as to bias the second seal lip into operative sealing engagement with the shaft to provide a second service life.

3 Claims, 5 Drawing Figures

PATENTED APR 17 1973  3,727,923

DOUBLE LIFE SHAFT SEAL

The present invention relates to fluid seals and, in particular, to shaft seals having plural independent sealing surfaces for preventing the flow of fluid.

Fluid seals, of the type conventionally used for sealing between a rotating shaft and a stationary housing, generally comprise a case mounted on the housing, an elastomeric sealing annulus attached to the case having a sealing lip adapted to engage the shaft, and a helically coiled garter spring retained on the outer surface of the sealing annulus for biasing the seal lip with engagement to the shaft. The garter spring provides sufficient inward biasing to maintain a lip pressure that prevents fluid leakage between the shaft and the lip. As the seal lip wears in usage, the lip pressure decreases and together with associated problems such as seal lip hardening and cracking such that the lip is no longer able to freely conform with the mating surface of the shaft. At this point, the seal can no longer contain fluid and, accordingly, fails.

The present invention provides a second service life for the fluid seal by incorporating an independent secondary sealing surface which becomes operative after predetermined wear of the original sealing surface. More particularly, the sealing annulus has a pair of axially spaced seal lips, each of which is adapted to engage the shaft. During the initial operating period, one of the lips engages the shaft while the other lip is slightly spaced therefrom. A shiftable garter spring provides the requisite biasing force on the first lip to maintain the sealing contact. A spring biased radially expanded split constriction ring locates the spring at this position. The ring is held at this first position by engagement with blocking lugs on the seal case. As the first seal lip progressively wears, the diameter of the constriction ring contracts. After predetermined wear of the first seal lip, the constriction ring loses contact with the blocking lugs and is biased to a second position wherein the garter spring is radially inwardly biasing the second lip into operative contact with the shaft. Thus, it will be appreciated that this second and independent sealing lip provides a second service life for the fluid seal.

The above and other features of the present invention will be apparent to one skilled in the art upon reading the following detailed description, reference being made to the accompanying drawings illustrating a preferred embodiment of the present invention in which.

Figure 1:
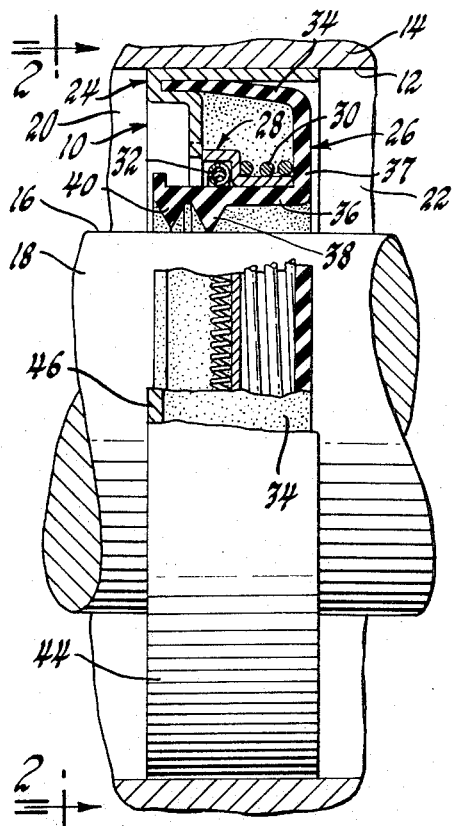
FIG. 1 is a partially sectioned view of the double life shaft seal made in accordance with the present invention shown mounted between a housing and a shaft.

Referring to FIG. 1, the double life shaft seal 10 made in accordance with the present invention is mounted in the annular space between an inner cylindrical surface 12 of an axial bore in a stationary housing 14 and the outer cylindrical surface 16 of a rotating shaft 18. The seal 10 serves to prevent the flow of fluid from a fluid chamber 20 to an air chamber 22. Although the present invention is shown and described with reference to a shaft installation, it will be appreciated that the invention is equally adaptable in other sealing installations such as face seals and reciprocating seals.

The double life shaft seal 10 generally comprises a case 24, a sealing annulus 26, a constriction ring 28, a ring biasing spring 30, and a garter spring 32.

Figure 3:
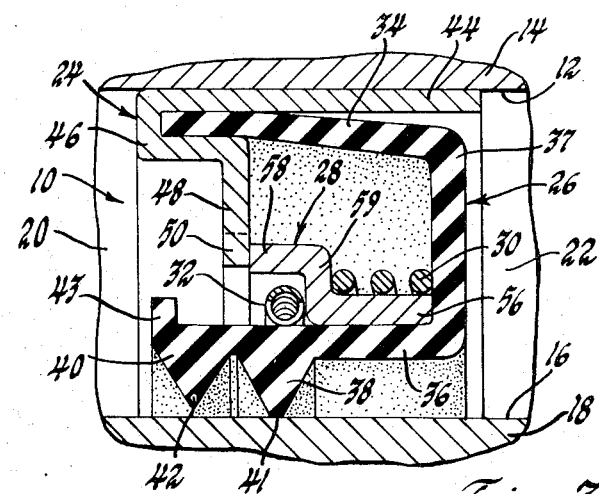
FIG. 3 is an enlarged sectional view showing the seal in the first service life position.

The sealing annulus 26 is formed of a suitable elastomeric material and generally comprises a cylindrical outer sleeve 34 and a cylindrical inner sealing sleeve 36, which are interconnected by an annular web 37. As shown in FIG. 3, the inner surface of the sealing sleeve 36 is provided with a pair of sharp radial seal lips 38 and 40 individually defined by pairs of radially inwardly converging frustoconical surfaces. The vertex of the rear or first seal lip 38 and the vertex of the front or second seal lip 40 define first and second sealing surfaces 41, 42 respectively, which have an interference fit with the surface 16 of the shaft 18. In initial installation, however, the first seal lip 38 compressively engages the surface 16 and the resulting expansion of the sleeve 36 in combination with the rearward radial biasing action of the constriction ring 28 slightly radially spaces the sealing surface 42 of the seal lip 40 from the surface 16. In achieving this initial operating relationship, the lips 38 and 40 may be of the same diameter or, if desired, the lip 40 can have a slightly larger diameter than the lip 38. However, both lips must be able to independently operatively contact the shaft 18.

Figure 4:
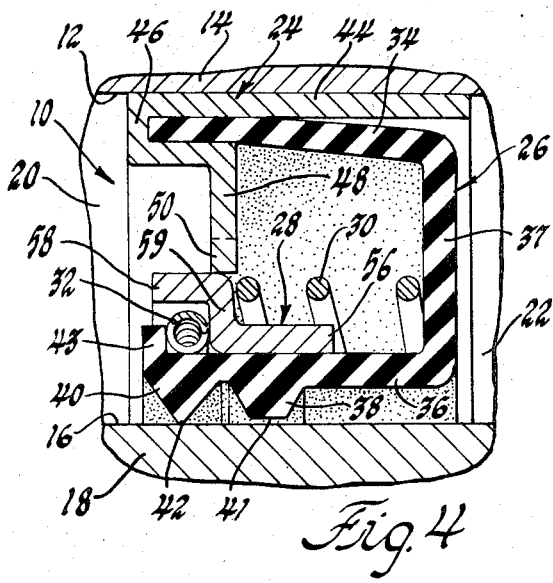
FIG. 4 is a view similar to FIG. 3 showing the seal in the second service life position.
Figure 5:
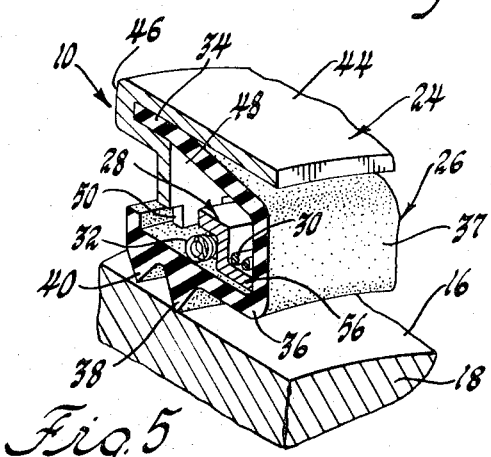
FIG. 5 is a partial perspective view of the subject seal showing details of construction.

The garter spring 32 is conventional in construction and comprises a circumferentially continuous helical wire. The spring 32 is radially outwardly tensioned expanded to provide a radially inwardly biasing force to the sealing sleeve 36. The spring 32 is shiftably retained on the outer surface of the sealing annulus 26. In the first service life position shown in FIG. 3, the spring 32 is axially located in operative biasing relationship over the first seal lip 38 by the constriction ring 28. In the second service life position shown in FIG. 4, the spring 32 is located in operative biasing relationship over the second seal lip 40 by a radially outwardly projecting annular shoulder 43 at the front of the sealing sleeve 36. As hereinafter explained, the garter spring 32 is automatically shifted after predetermined wear of the sealing surface 41 of the first seal lip 38 from the FIG. 3 position to the FIG. 4 thereby providing selective biasing of the seal lips 38 and 40.

The seal case 24 comprises a metallic stamping and includes a cylindrical outer section 44 which frictionally engages the surface 12 of the housing 14. The case 24 is provided with a rearwardly crimped front section 46 which compressively grips the outer sleeve 34 of the sealing annulus 26 to retain the latter on the case 24. The front section 46 radially inwardly terminates with an annular blocking ring 48 having a pair of diametrically opposed radially inwardly projecting blocking lugs 50.

Figure 2:
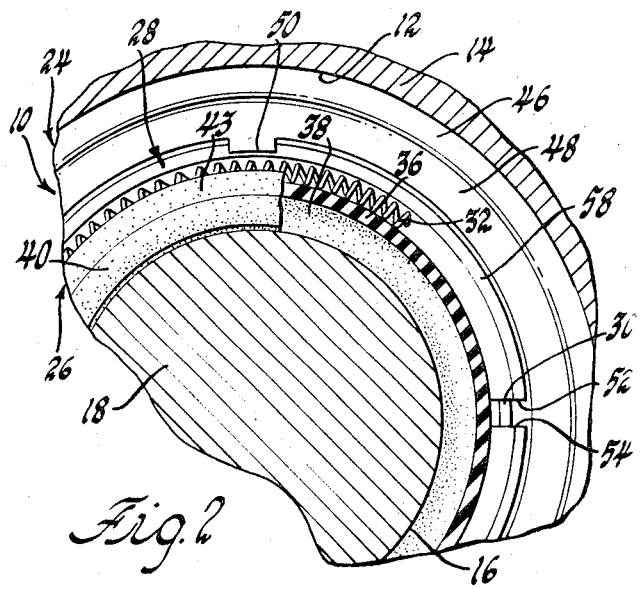
FIG. 2 is a fragmentary view taken along line 2—2 of FIG. 1 showing the engagement between the blocking lugs and the constriction ring during the first service life of the seal.

Referring to FIG. 2, the constriction ring 28 comprises a metallic stamping and has a single axial split or radial gap as defined by ring end surfaces 52 and 54. The constriction ring 28 has a rearward cylindrical section 56 which slidably engages the outer surface of the sealing sleeve 36 and a radially outwardly spaced front section 58. The sections 56 and 58 are interconnected by an annular shoulder 59. In operative relationship over the sealing sleeve 36, the constriction ring 28 is radially outwardly expanded to an enlarged diameter. In the first service life position shown in FIG. 3, the front section 58 is a diametral interference with the blocking lugs 50. Accordingly, the constriction ring 28 is axially locked with this position against the biasing of the helically coiled ring biasing spring 30. However, as frictional wear takes place at the first seal lip 38, the diameter of the sealing annulus at this position gradually decreases. During this time, the constriction ring 28 will contract in diameter to take up the wear at the seal lip 38. After predetermined wear of the sealing surface 41, the front section 58 contracts sufficiently in diameter to clear or slip under the blocking lugs 50. Thereupon, the spring 30 will bias the constriction ring 28 and the garter spring 32 forwardly along the outer surface of the sealing sleeve 36 to the FIG. 4 or second surface life position whereat movement is restrained by engagement with the shoulder 43.

At the first service life position, the radial biasing is provided primarily by the garter spring 32. However, the constriction ring 28 will provide a small amount of biasing. Additionally, the biasing by the ring 28 will provide an inward biasing on the rear portion of the sealing sleeve 36, which will tend to pivot the latter about the lip 38 to provide forces tending to lift the seal lip 40 from the surface 16. In the second service life position, the garter spring 32 provides operative biasing of the second seal lip 40 against surface 16 of the shaft 18 and the resiliency of the web 37 and the outer sleeve 34 will tend to slightly space the lip 38 from the surface 16. Accordingly, a second and independent seal lip is provided for the seal 10 which will function substantially in the same manner as the original lip.

While the present invention has been described with reference to automatically operative means for selectively biasing the lip, it will be appreciated that manual means can be provided for shifting the spring 32 between an initial operative position at the first lip 38 to a second operative position at the second lip 40 after predetermined wear of the first sealing surface 41.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:
1. A fluid seal comprising:
a casing member;
a flexible sealing element connected to said casing member, said sealing element having a pair of annular sealing surfaces facing a surface to be sealed, one of the sealing surfaces adapted to normally operatively engage said surface to be sealed;
shiftable means operable at a first position for biasing said one of said sealing surfaces into engagement with said surface to be sealed and operable at a second position for biasing the other of said sealing surfaces into engagement with said surface to be sealed;
means associated with said shiftable means for holding the latter at said first position until predetermined wearing of said one of said sealing surfaces and thereafter releasing said shiftable means;
and means for moving said shiftable means to said second position after said releasing whereby said other of said sealing surfaces is operatively biased into engagement with said surface to be sealed.

2. A fluid seal for sealing the space between relatively rotating members comprising: a casing member mounted on one of the members; a flexible sealing element connected to said casing member; a pair of annular sealing lips projecting toward the other of said members, one of the lips adapted to normally engage said other of said members with the other of said lips being initially spaced therefrom; first spring means slidably retained on said sealing element for selectively biasing said lips; a shiftable element on said sealing element engaging said first spring means, said shiftable element being movable from a normal first position wherein said first spring means operatively biases one of said lips to a second position wherein said first spring means operatively biases said other of said lips; stop means associated with the shiftable element for holding the latter at said first position until predetermined wearing of said one of said lips; and second spring means between said casing member and said shiftable member for shifting the latter to said second position after said predetermined wearing whereby said other of said lips engages said other of said members to provide a second seal life.

3. A dual life shaft seal for sealing the space between a relatively rotating shaft and housing comprising: an annular case mounted on said housing; a sealing annulus formed of a flexible material connected to said case, said sealing annulus including a cylindrical sleeve spaced from the shaft; first and second seal lips formed on the inner surface of and axially spaced along said sleeve, said first and second seal lips having first and second sealing surfaces individually defined by radially inwardly converging frustoconical surfaces, both of said sealing surfaces adapted to engage the shaft with said first sealing surface normally engaging the shaft and said second sealing surface being initially radially spaced therefrom; a tensioned helical spring slidably retained on the outer surface of said sleeve for radially inwardly biasing either of said lips; a split annular contractable ring slidably received over said outer surface of said sleeve and engaging said helical spring; an inwardly projecting tab on said case normally locating said ring and said helical spring at a first position wherein said spring radially inwardly biases said first seal lip thereby providing a first service life for said seal, said ring contracting in diameter upon wearing of said first seal lip and disengaging from said tab after predetermined lip wear; spring biasing means acting on said ring and shifting said ring and said spring after said predetermined lip wear to a second position wherein said helical spring radially inwardly biases said second lip against the shaft to provide a second service life for said seal.

* * * * *